W. F. POST.
TURNBUCKLE.
APPLICATION FILED NOV. 14, 1910.
1,012,008.
Patented Dec. 19, 1911.
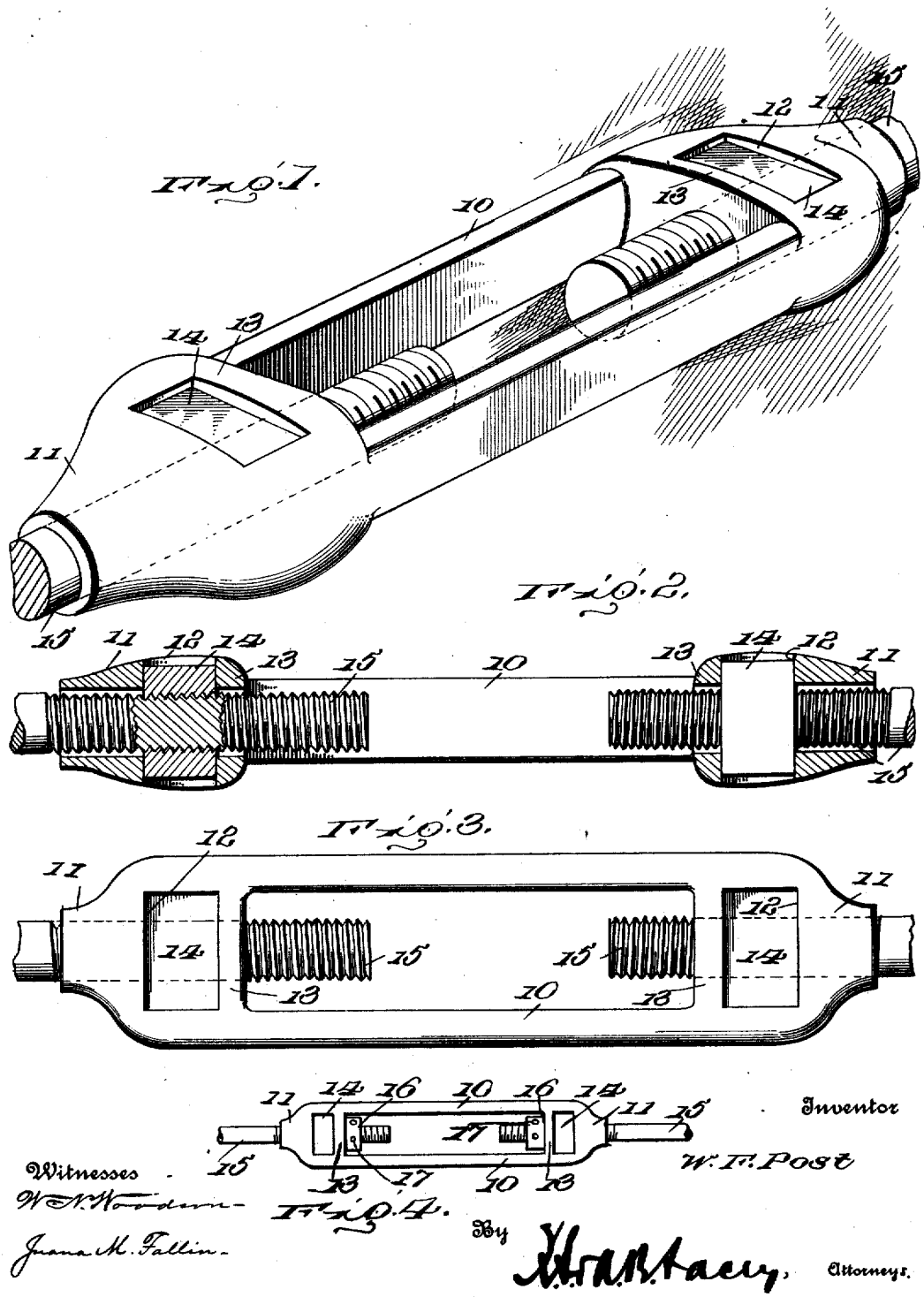

UNITED STATES PATENT OFFICE.

WILLIAM F. POST, OF ASHEVILLE, NORTH CAROLINA.

TURNBUCKLE.

1,012,008.  Specification of Letters Patent. Patented Dec. 19, 1911.

Application filed November 14, 1910. Serial No. 592,379.

*To all whom it may concern:*

Be it known that I, WILLIAM F. POST, citizen of the United States, residing at Asheville, in the county of Buncombe and State of North Carolina, have invented certain new and useful Improvements in Turnbuckles, of which the following is a specification.

This invention relates to turnbuckles and has for its object to provide a turnbuckle having a main yoke or frame which is formed without threads, and in which is adapted to be placed nuts of common form to hold the meeting ends of the rods which are engaged through the opposite ends of the yoke, and thereby provide a frame which can be continuously used and which does not have to be thrown away when the threads in the nuts are broken.

The invention has for another object to provide a yoke or frame which is integral, and which may be cast of suitable metal, and which is provided with pockets for the reception of nuts of common form which are held in the pockets from rotation so as to act in the capacity of the inner threaded ends of turnbuckles now commonly employed.

The invention has for a further object the provision of an integrally formed yoke for a turnbuckle which is provided with cross-bars spaced inwardly from the ends of the yoke for the reception of binding or jam-nuts against their inner faces when it is desired to carry the same upon the inner ends of the rods.

There is believed to be further advantages in coupling and adjusting rods which receive longitudinal reciprocating motion, as in connecting brake-rods and the like so as to prevent any lost motion at the connection.

For a full understanding of the invention reference is to be had to the following description and accompanying drawing in which:—

Figure 1 is a perspective view of the complete turnbuckle. Fig. 2 is a longitudinal sectional view through the same. Fig. 3 is a top plan view of the turnbuckle. Fig. 4 is a top plan view of the modified form of the turnbuckle.

Corresponding and like parts are referred to in the following description and indicated in all the views of the accompanying drawing by the same reference characters.

Referring to the drawing the numerals 10 designate a pair of spaced arms which comprise the sides of the yoke or body-portion of the turnbuckle and which terminate at their opposite ends in sleeves 11. The inner ends of the sleeves 11 are formed into flat faces 12. The arms 10 are provided adjacent to their opposite ends with cross-bars 13 which are spaced inwardly from the inner ends of the sleeves 11 and provide therebetween pockets for the reception of nuts 14. It will be noted that the pockets formed by the sleeves 11 and the cross-bars 13, and the ends of the arms 10 are of such size as to confine the nuts 14 loosely therein to prevent their rotation. Rods 15, which are oppositely threaded at their inner ends, are inserted loosely through the sleeves 11 and engage the nuts 14. The cross-bars 13 are provided with apertures through their central portions registering with the openings through the sleeves 11 to loosely receive the inner ends of the rods 15.

The yoke or body of the turnbuckle is cast integral and includes the sleeve 11, the side-bars or arms 10 and the cross-bars 13. It will be noted that the sleeves and the cross-bars are provided with inner smooth faces having no threads so that the rods 15 engage loosely therethrough. The nuts 14 are of angular form, and are of a size sufficient to receive the threaded ends of the rods 15 and to bind the corners thereof against the inner walls of the pockets to prevent the rotation of the nuts when the yoke is turned. When the threads in the nuts 14 are broken it is not necessary to discard the complete yoke, but a new nut 14 can be replaced in the pocket.

In Fig. 4 a jam-nut 16 is disclosed which is positioned upon the inner end of the rod 15 and against the cross-bar 13. The auxiliary, or the jam-nut 16 is preferably of cylindrical form having a plurality of openings 17 in the sides thereof for the reception of a pointed instrument as a nail, or the like, adapted to turn the nut 16 between the arms 10 of the yoke. The nut 16 is turned to bind against the inner face of the cross-bar 13 and to thereby serve as a locking means to prevent the longitudinal vibration of the rod 15 through the cross-bar 13. The jam-nut 16 is adapted to be employed in connection with the turnbuckle in connecting rods which receive reciprocating movement or wherein it is desired to take up all lost motion. It is also employed in holding the yoke from turning upon the rod 15 under vibration.

Having thus described the invention what is claimed as new is:—

As an article of manufacture a turnbuckle yoke comprising an integral casting having spaced arms terminating in sleeves joining their ends, the sleeves having registering openings, the arms further having cross bars spaced inwardly from the sleeves and provided with openings registering with the openings in the sleeves.

In testimony whereof, I affix my signature in presence of two witnesses.

WILLIAM F. POST. [L. S.]

Witnesses:
OTHO R. S. POOL,
JOHN F. JACKSON.

Copies of this patent may be obtained for five cents each, by addressing the "Commissioner of Patents, Washington, D. C."